Dec. 6, 1955    N. F. HOSFORD    2,726,075
ACCELEROMETER TRANSMITTER SYSTEM
Filed Feb. 3, 1951    2 Sheets-Sheet 1

INVENTOR.
NORMAN F. HOSFORD
BY
C. R. Miranda
ATTORNEY

INVENTOR.
NORMAN F. HOSFORD
BY
C. R. Miranda
ATTORNEY

United States Patent Office 2,726,075
Patented Dec. 6, 1955

2,726,075

ACCELEROMETER TRANSMITTER SYSTEM

Norman F. Hosford, Towaco, N. J., assignor to Bendix Aviation Corporation, Teterboro, N. J., a corporation of Delaware Application February 3, 1951, Serial No. 209,315

13 Claims. (Cl. 264—1)

This invention relates to transmitters of intelligence signals and more particularly to an accelerometer transmitter for electrically transmitting signals of positive and negative acceleration.

In order to determine the causes leading up to aircraft crashes and mishaps, it is necessary to know the operating conditions of the craft previous to the crash. Where the cause of the crash is due to a sudden positive or negative acceleration, as encountered in a violent storm, or when the craft encounters sudden updrafts and downdrafts, the pilots are usually too busy controlling the craft to record the flying conditions in a log book. For this reason, it is necessary to have a flight recorder in the aircraft which operates automatically and independently of the pilot to record the maximum peak accelerations in order to determine the effect thereof on the craft.

In a violent storm the craft may be subjected to very rapid frequency periods of acceleration which may be a second apart or even less. Difficulty is usually encountered in recording these rapid accelerations because the frequency period of the acceleration is faster than the frequency response rate of the transmission system, or, faster than the frequency response rate of the recorder. This condition results in erratic operation of the recorder and accurate indications are extremely difficult to obtain. Servo systems are particularly subjected to this condition because the rapid rotor travel of the transmitters tends to place the signal receiving device out of phase therewith and accordingly present the problem of oscillation.

The instant invention, therefore, is directed towards a transmitting accelerometer which employs a pair of transmitting devices to transmit signals of positive and negative vertical acceleration respectively, to a signal receiving device. Means are also provided in the form of dashpots to delay or dampen the return of the transmitting devices to a normal or null position. The transmitter may be utilized in connection with a receiver indicator, or, with a recorder as disclosed herein.

Accordingly, it is an object of the present invention to provide an improved accelerator transmitter for transmitting to a remote point signals of positive and negative vertical acceleration.

Another object is to provide a novel accelerometer transmitter for accurately transmitting signals of acceleration when the frequency period of the acceleration is faster than the frequency response rate of the transmission system, or, faster than the frequency response of a recorder connected thereto.

A further object is to provide a novel accelerometer transmitter wherein damping means are provided for reducing the rate of return of the transmitting devices to retain the latter in phase with the receiving device.

Still another object is to provide a novel accelerometer transmitter wherein selective switching means are provided for allowing only the signals of greatest displacement at any one instant, positive or negative, to be recorded on a recorder.

A still further object is to provide an accelerometer transmitter for transmitting signals of maximum peaks of positive and negative acceleration to a remotely located recorder to indicate conditions of flight.

The above and other objects and advantages of the present invention will appear more fully hereinafter from a consideration of the detailed description which follows, taken together with the accompanying drawings wherein one embodiment of the invention is illustrated.

In the drawings, wherein like reference characters refer to like parts throughout the several views, Fig. 1 is a diagrammatic representation of the novel accelerometer transmitter comprising the instant invention;

Figure 1:
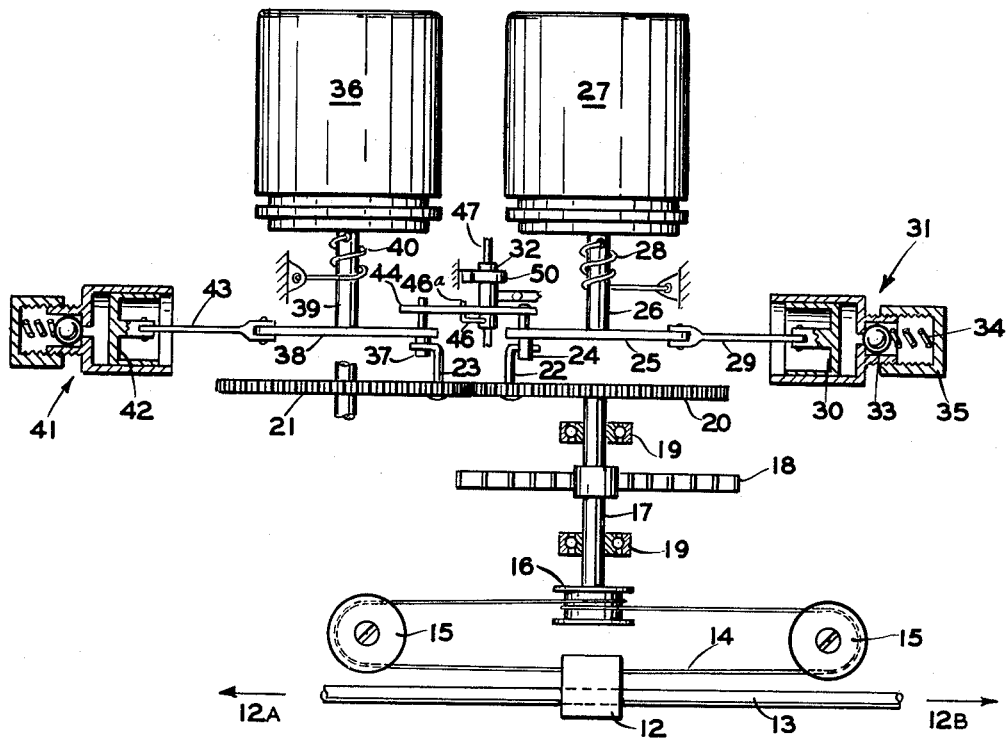

Referring now to the drawings for a more detailed description of the present invention and more particularly to Figure 1 thereof, the novel accelerometer transmitter hereof is shown as comprising a movable mass or slug 12 which responds to positive or negative forces of acceleration and which is slidable on a guide bar 13 by means of a cord 14 attached thereto. Cord 14 runs over a pair of pulleys 15 to rotate a pulley 16 which is secured to a shaft 17. Shaft 17 rotates with pulley 16 and has attached thereto a calibrated restraining spring 18. The aforementioned structure is conventional and is substantially disclosed in U. S. Patent No. 2,394,974 issued February 19, 1946.

Shaft 17 is rotatably supported in bearings 19 and has fixed thereon at its other end a gear 20 which meshes with a second gear 21. Gears 20 and 21 have secured near their perimeters inverted L-shaped posts 22 and 23, respectively. The toe portion of post 22 on gear 20 is positioned so as to engage a pin 24 secured to the underside of a follower lever 25. Lever 25 is fastened to the rotor shaft 26 of an inductive signal developing device 27, it being noted that shaft 26 is arranged in alignment with shaft 17. Shaft 26 has a return spring 28 fixed thereto to normally urge the shaft to a reference position and, therefore, the device 27 to a null or non-signal developing position. Pivotally secured to follower lever 25 is a link 29 which is pivotally connected to a piston 30 of a dashpot generally designated by the numeral 31. Dashpot 31 has a check valve consisting of the usual ball member 33 and coil spring 34 with means for adjusting the tension on spring 34 by a threaded member 35. It is readily apparent from the drawing that the piston 30 is allowed to move freely into the dashpot 31 but is restrained therein when a force is applied to the piston to pull it out of the dashpot. By use of this structure, the return of rotor shaft 26 by spring 28 is delayed by dashpot 31.

A second inductive signal developing device 36 is adapted for displacement by mass 12 by structure generally similar to the structure for displacing signal device 27. Post 23 of gear 21 engages a pin 37 on a follower lever 38 fixed to a rotor shaft 39 of signal device 36. Shaft 39 is normally urged to a reference position, where signal device 36 is in a non-signal generating position, by a restraining spring 40 fixed thereto. A damping means or dashpot 41 acts on shaft 39 through a piston 42 and a rod 43 pivotally connected to lever 38.

Considering the operation of the arrangement thus far described, the accelerometer will be installed in an aircraft with the guide bar 13 substantially perpendicular to both the fore and aft as well as the transverse axis of the craft so that mass 12 will respond to vertical accelerations. With the aircraft in flight along a straight path or normal "1g" (unit of gravity) position, the mass 12 will assume a position midway between pulleys 15 as shown in Fig. 1. If an airpocket, or downdraft, is encountered, the craft will suddenly move downwardly and mass 12 will be acted upon by a force of positive vertical acceleration (indicated by arrow 12A) to move it to the left as seen in Fig. 1 (upwardly in the craft). Mass 12 in moving to the left rotates shaft 17 and gear 20 in a clockwise direction (looking at the mechanism from behind mass 12 in Fig. 1). Post 22 on gear 20 moves lever 25 and rotor shaft 26 in a clockwise direction through pin 24 against spring 28 to effect displacement of the rotor of signal device 27 with respect to its stator, thereby developing a signal (to be explained hereinafter) proportional to the amount of movement of mass 12 from its centralized position. When the craft has reached its maximum peak of acceleration in that direction and immediately thereafter the acceleration ceases, mass 12 will begin to move back to its centralized position. Rotor shaft 26 will not move back to its null position as quickly as mass 12 because of the restraining force applied thereto by dashpot 31. It is readily apparent that rotor shaft 39 of signal device 36 will not be displaced during such time because gear 21, which is meshed with gear 20, rotates in a counter-clockwise direction due to the clockwise motion of gear 20 thereby effecting positive disengagement of post 23 with pin 37. Rotor shaft 39 will, therefore, remain in a reference position due to the restraining force applied thereto by spring 40. Similarly, when the craft is subjected to an upward force, or negative acceleration (as indicated by arrow 12B), mass 12 moves to the right (downwardly with respect to the craft) to rotate shaft 17 counter-clockwise, and gear 21 clockwise to permit engagement of post 23 with pin 37 and thereby displace rotor shaft 39 of signal device 36. Rotor shaft 26 of signal device 27 will not be displaced upon the occurrence of negative acceleration because the post 22 moves away from pin 24 i. e., when gear 21 moves in a clockwise direction gear 20 will move in a counter-clockwise direction.

Figure 2:
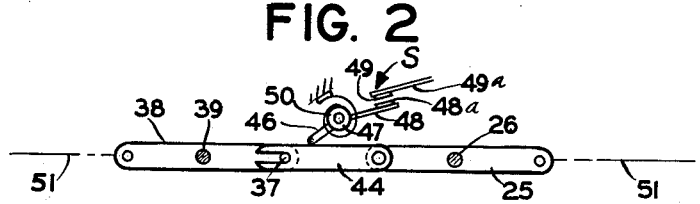
Fig. 2 is a diagrammatic illustration of the selective circuit making and breaking switch, in normal flight position, utilized in the novel accelerometer transmitter of Figure 1.
Figure 2A:
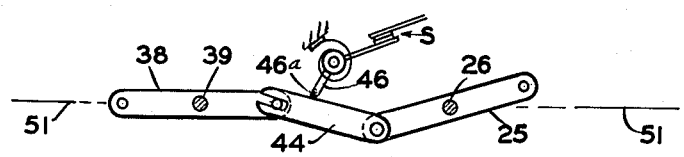
Fig. 2A is a diagrammatic view of the selector switch during a positive acceleration.
Figure 2B:
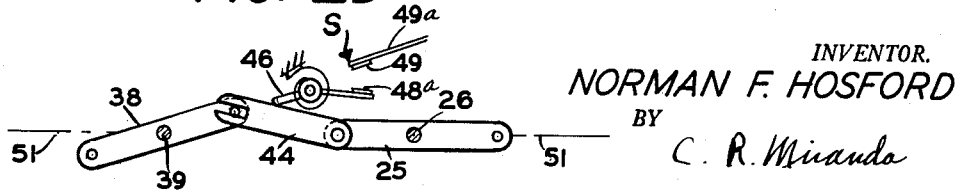
Fig. 2B is a diagrammatic illustration of the selector switch during a negative acceleration.

Connected between follower levers 25 and 38 is a link 44 pivotally connected at one end to lever 25 and provided at its other end with a slot straddling a pin 37 supported at one end of lever 38 (Fig. 2). Bearing against link 44 and at a point midway between the centers of rotation of levers 25 and 38, which is directly above the point of engagement of gears 20 and 21, is the toe portion 46a of an arm 46 secured to a collar 32 on a shaft 47. Also mounted on shaft 47 and forming part of a selector switch S is a contact arm 48 which has located on one face thereof an electrical contact 48a. Positioned adjacent contact 48a is a second electrical contact 49 secured to a fixed and adjustable contact arm 49a. Contact 49 may be adjusted by means not shown, to decrease or increase the distance separating contacts 48a and 49. A restraining spring 50 is fixed to shaft 47 to normally urge the latter in a counterclockwise direction as seen in Fig. 2. The levers 25, 38 and link 44 will assume the position shown in Fig. 2 when the mass 12 is in its normal or centralized position between pulleys 15. It is to be noted that the contacts 48a and 49 are disengaged at this instant with a very small gap therebetween. If the lever 25 were to be moved counter-clockwise as seen in Fig. 2A due to a positive acceleration acting on mass 12, link 44 moves away from toe portion 46a. At this instant, contacts 48a and 49 will engage due to the action of spring 50 urging shaft 47 in a counterclockwise direction. Now, if we assume that a negative acceleration acts on mass 12, lever 38 moves to the position shown in Fig. 2B to force link 44 against arm 46 to move the latter in a clockwise direction to disengage contacts 48a and 49. It may be readily understood that due to the geometry of the arrangement of elements, the lever having the greatest displacement away from a center-line 51 will move the arm 46 to make or break switch S. In other words, since the toe portion 46a is at a point midway between the centers of rotation of levers 25 and 38, equal displacement in opposite directions of the ends of the levers connected to link 44 from center-line 51 will not result in movement of arm 46. If it is assumed that the inner end of lever 25 has been displaced downwardly an angular distance of 30 degrees (maximum peak of positive acceleration) from the center-line 51, link 44 will have moved away from arm 46 permitting contacts 48a and 49 to engage. If an instant later, while lever 25 is slowly moving back to its normal position and is 28 degrees away from such position, and due to a maximum negative acceleration lever 38 moves in a counter-clockwise direction an angular distance of 20 degrees, the contacts 48 and 49 will remain engaged because link 44 will not have been moved above the center-line 51. However, when the angular displacement of lever 38 is greater than the angular displacement of lever 25, for example, considering lever 38 to have been displaced 35 degrees as compared with the 28 degrees displacement of lever 25, contacts 48a and 49 will disengage to open the switch. The purpose of this structure will be presently explained.

Figure 3:
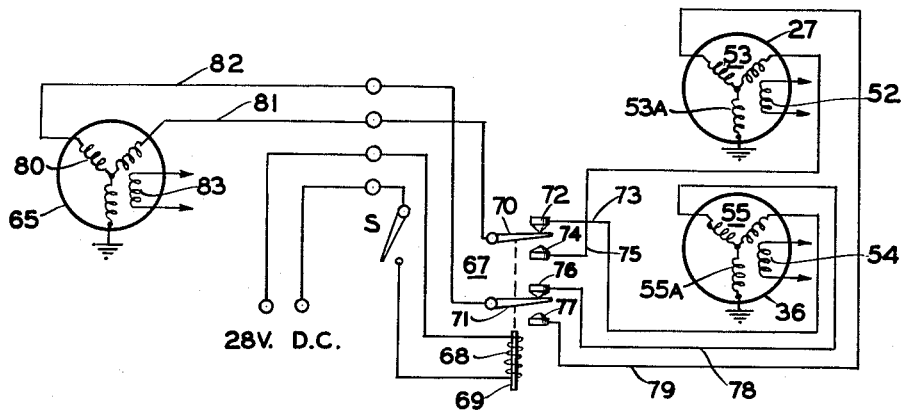
Fig. 3 is a wiring diagram of the electrical circuit employed in the novel accelerometer transmitter of the present invention.

Signal devices 27 and 36 may be inductive signal developing devices wherein a single phase rotor winding inductively associated with a three phase stator winding induces a voltage or signal in the latter upon displacement of the former with respect to the stator winding. The developed signal is directly proportional to the displacement of the rotor winding so that the displacement of the latter may be measured by the magnitude of the signal induced. In the instant invention, signal device 27 is provided with a rotor winding 52, as better shown in Figure 3, energized from a suitable alternating current source and mounted for angular displacement by shaft 26. Inductively associated with winding 52 is a three phase stator winding 53 in which the signal is developed. Signal device 36, which develops signals corresponding to negative acceleration, similarly includes an energized single phase rotor winding 54 mounted for angular displacement by shaft 39 inductively coupled with a three phase stator winding 55. Legs 53A and 55A of stator windings 53 and 55, respectively, are grounded as shown in Fig. 3. The signal transmitting devices 27 and 36 are selectively connected to a signal receiving device 65, located in a remotely positioned indicator or recorder, generally designated as 66 (Fig. 4), by a D. C. operated relay 67. Selector switch S energizes relay 67 through a winding 68 surrounding relay armature 69 which has connected for movement therewith a pair of arm contacts 70 and 71. Mounted for engagement with contact 70 are a stationary contact 72 connected to one of stator windings 55 of signal device 36 by a conductor 73, and a stationary contact 74 connected to one of stator windings 53 of signal device 27 by a conductor 75. Arm contact 71, on the other hand, is adapted for engagement with one or the other of a pair of spaced stationary contacts 76 and 77, the former being connected to another of stator windings 55 by conductor 78, while the latter is connected to another of stator windings 53 by way of conductor 79. In its normally unenergized position (as seen in Fig. 3) arms 70 and 71 are in engagement with contacts 72 and 76, respectively, to connect signal transmitting device 36 with the upper legs of stator winding 80 of receiver device 65 by way of leads 81 and 82. The bottom leg of stator winding 30 is grounded as are legs 53A and 55A to provide a synchronous system. When relay 67 is energized, by closure of switch S, arms 70 and 71 disengage contacts 72 and 76 and engage with contacts 74 and 77 to connect stator windings 53 of signal transmitting device 27 with receiver device 65 by way of leads 81 and 82.

Figure 4:
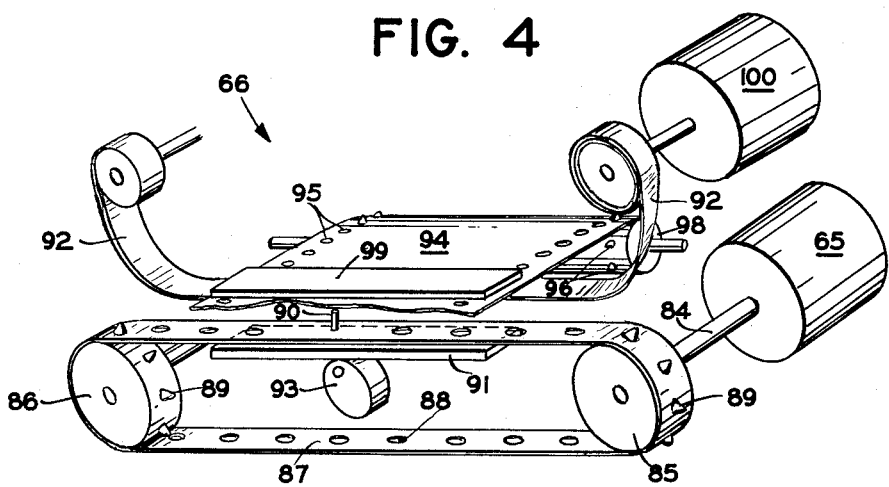
Fig. 4 is a diagrammatic illustration of the recorder employed in connection with the novel accelerometer transmitter.

Receiver device 65 includes a rotor winding 83, energized from a suitable source of alternating current, the rotor winding being carried by a shaft 84, Figure 4, for angular displacement relative to its wound stator 80. Angular displacement of rotor 83 will be determined by the presence of a signal in one or the other of the stators of signal transmitting device 27 or 36 and the amount and direction of such displacement will depend upon the magnitude and phase of the signal of the transmitting device, it being noted that rotor 52 of transmitter 27 will be moved in one direction in response to positive acceleration to develop a signal of one phase and that rotor 54 of transmitter 36 will be moved in an opposite direction in response to negative accelerations to develop a signal of an opposite phase. Therefore, signals from signal transmitter 27 will tend to displace shaft 84 in one direction while the signals coming from signal transmitter 36 will displace shaft 84 in the opposite direction. Since transmitter 36 is normally connected to receiving device 65, and closure of switch S connects the latter with transmitter 27, it is apparent that device 65 receives at any instant one signal, either a signal corresponding to positive acceleration or a signal corresponding to negative acceleration. In addition, because of the arrangement of levers 25, 38 and link 44, the latter of which actuates switch S, which in turn actuates relay 67, only the transmitter having the greatest angular displacement from the normal position (thus, the greatest "g" displacement from "1g") will be connected to receiving device 65. By means of the foregoing structure, the receiving device 65 receives only signals of maximum peaks of positive or negative acceleration at any one instant until the link 44 returns to the center-line 51 due to the damping means defined by dashpots 31 and 41. Inasmuch as the information desired usually requires simply indications of signals of maximum peaks, the instant invention satisfactorily fulfills these requirements.

Rotor shaft 84 of receiver 65 is secured to a sprocket wheel 85 diagrammatically illustrated in Fig. 4. A second sprocket wheel 86 is spaced from the first wheel, and running over both wheels is an endless tape 87 having perforations 88 therein to engage sprockets 89. Fastened to the tape 87 and movable therewith is a printing pin 90 adapted to be intermittently engaged by a backing plate 91 which presses the pin against an inked ribbon 92. The plate 91 is moved into engagement with pin 90 once every second by a motor driven cam 93. In front of the inked ribbon 92 is a sheet 94 of chart paper. Sheet 94 has a series of openings 95 formed along the longitudinal edges thereof which are engaged by pins 96 formed on a rubber roll 98. The roll is driven at a predetermined rate to move sheet 94 at about 4 inches per hour. Directly above the sheet 94 is a second plate 99 which provides a backing for the sheet. Pin 90 upon being engaged by plate 91 presses against inked ribbon 92, which is driven once every second by a motor 100, to imprint a small "dot" on the chart. The pin 90 is shown in Fig. 4 in its central position when the craft is in normal flight and no acceleration forces are present. However, in response to a positive acceleration, a signal is transmitted by the transmitter 27 to receiver 65 whereupon the rotor shaft 84 will be displaced to move sprocket wheel 85 in a clockwise direction thereby moving pin 90 to the right as viewed in Fig. 4. Similarly, in response to a negative acceleration sprocket wheel 85 is moved in a counterclockwise direction to move pin 90 to the left of its central position. Thus, all positive and negative accelerations of the craft in flight may be permanently recorded on chart 94.

Figure 5:
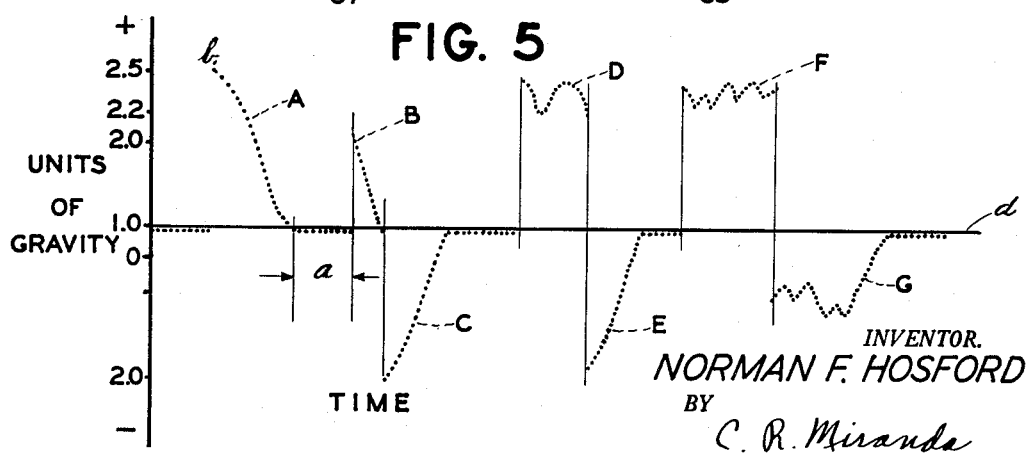
Fig. 5 is an illustration of a recording sheet disclosing the acceleration curves obtained through use of the present invention.

Figure 5 illustrates the recording sheet 94 which has the values of accelerations encountered printed thereon, having time for its axis of abscissas and units of gravity (g) for its axis of ordinates. The sheet 94 as shown in Fig. 5 is displaced 90 degrees from its actual position for purposes of clarity. It is to be noted that pin 90 normally is positioned adjacent the axis of abscissas. The dots heretofore mentioned may be readily seen in Fig. 5 as forming the acceleration curves. An examination of an actual flight record of a craft may be observed from the curves shown on the chart. Curves A and B respectively, indicate that the craft was subjected to a positive acceleration of two and a half g's and two g's. The distance $a$ indicates that between the two positive accelerations the craft was in normal flight. Curve C indicates that after the craft passed through these positive accelerations it was subjected to a negative acceleration of two g's after which it resumed normal flight. Thereafter, the craft became subject to another positive acceleration its positive peak acceleration commenced with 2.4 g's, came down to 2.2 g's, was subjected to a second peak of acceleration up to 2.38 g's after which the craft gradually came down to 2.1 g's. At this point in time, the craft was suddenly subjected to an updraft which effected a negative acceleration of 1.9 g's, after which peak the craft slowly came back to normal flight. Examining this chart further, we find that the craft hit a number of downdrafts which are indicated in curve F, and that a short time later it was subject to a number of updrafts as seen by curve G.

The curves disclosed clearly illustrate the operation of the instant invention. A consideration of curve A will disclose that the peak of maximum acceleration was reached at $b$ at which time the angular displacement of transmitter 27 was the greatest. Due to dashpot 31 the rotor of transmitter 27 slowly returned to the normal "1g" position as indicated by the body of the curve. It is to be understood that return of transmitters 27 and 36 may be adjusted since the dashpot is adjustable. Thus, the decay time of the maximum peak signal may be adjusted by changing the damping characteristic of the dashpot. When portion $a$ on the chart was traversed by the craft neither transmitter developed an appreciable signal. However, since selector switch S is normally open in level flight, a series of dots will be seen on the horizontal datum line $d$. The curves D and E are of interest because they indicate that when the craft was returning from a positive acceleration to normal flight condition, it was suddenly subjected to a negative acceleration. It is to be noted that the curve E begins at 1.9 (negative) g's. The reason for this is that lever 38 had moved sufficiently to displace link 44 to overcome the angular displacement of lever 25 thereby opening switch S to allow a signal of negative acceleration to be transmitted to the recording device 65 from signal transmitter 36. Thus, it may readily be understood that the geometry of the arrangement of levers 25, 35 and link 44 is such that the signal transmitter with the greatest angular displacement from its normal position will be operatively connected to receiver device 65.

The instant invention also provides a method of transmitting these signals even though the frequency period of the acceleration may be faster than the frequency response rate of the transmission system and/or the frequency response of recorder 66. If it is assumed that dashpots 31 and 41 are not used in the system, and the frequency period of acceleration is as fast as shown in curves F and G, then sudden and rapid, forward and return motions of the transmitter rotors 52 and 54 would transmit signals too fast for receiver device 65. As a result, the rotor of receiver 65 as affected by stator winding 80 would tend to oscillate and become out of phase with the displacement signals of transmitters 27 and 36 to effect inaccurate indications of acceleration. However, with the inclusion of dashpots 38, 41 and selector switch S the receiver 65 need not be returned to a null position after every peak by the related transmitter but may pick up the signals from the transmitters 27 and 36 shortly after they pass their peak displacements and before the rotor of receiver 65 has completely returned to its null position. Considered in another manner, even though a signal exists in one of the transmitters so that the rotor of the receiver is displaced from null, it will nevertheless position itself into synchronism with the other transmitter as soon as the latter is connected thereto through the switching mechanism. In this manner, the recorder will quickly respond to the signals of the signal transmitters 27 and 36 and still remain in phase therewith. In these cases, the recorder will record the maximum peak signals of acceleration which in practical use is all that is required.

The movement of the sheet 94 at approximately four inches per hour and the printing by the pin 90 once a second allows all peaks of acceleration to be recorded no matter how fast the accelerations occur. It may be seen that the dashpots 31, 41 provide the recorder 66 with a memory, i. e., the receiver device 65 does not have to return to a null position before it receives a successive acceleration signal, but picks it up before the null position is attained. The use of inked ribbon 92 in printing the flight of the craft ensures that sheet 94 will not be smeared with ink whenever crashes occur as is the case where an inked pen prints the record.

It may readily be appreciated by those skilled in the art that the instant invention may be used to measure horizontal as well as vertical positive and negative accelerations when the accelerometer is mounted in automobiles, ships and railway cars.

Although one embodiment of the invention has been illustrated and described in detail, it is to be expressly understood that the invention is not limited thereto. Various changes may be made in the design and arrangement of the parts without departing from the spirit and scope of the invention as will be understood by those skilled in the art.

I claim:

1. In combination with an accelerometer having a mass movable in response to negative and positive accelerations, a pair of signal generating devices, means connecting one of said devices for operation by said mass during positive acceleration, means connecting the other of said devices for operation by said mass during negative acceleration, controlled means adapted for selective connection to one or the other of said devices for receiving the signals thereof, and means operated by said mass during positive acceleration for electrically coupling one of said devices to said controlled means and operated by said mass during negative acceleration for electrically coupling the other of said devices to said controlled means.

2. In combination with an accelerometer having a mass movable in response to negative and positive accelerations, a signal generating device, means connecting said device for operation by said mass during one acceleration, controlled means in circuit with said device and adapted for operation thereby, and switching means operated by said mass during another acceleration for making said device ineffective on said controlled means.

3. In combination with an accelerometer having a mass movable in two directions in response to accelerations acting thereon, a signal generator, means operatively connecting said generator for operation by said mass upon movement in one direction in response to accelerations for developing an electric signal of a magnitude and phase corresponding to the amount and direction of said one acceleration, controlled movable means adapted for connection to said generator whereby in response to the signal thereof said controlled means is moved an amount and in a direction corresponding to the magnitude and the phase of the signal, and means including a switch in circuit with said generator and said controlled means and operated by said mass upon movement in the opposite direction in response to accelerations for making said generator ineffective on said controlled means.

4. In apparatus for transmitting signals of positive and negative acceleration to a remote point, a mass movable in response to positive and negative accelerations, a pair of electrical devices for developing and transmitting signals to the remote point, means connecting one of said devices and disconnecting the other device for operation by said mass during a positive acceleration and connecting said other device and disconnecting said one device for operation by said mass during a negative acceleration, and means operable by said first-mentioned means for rendering one of said devices electrically effective and the other device electrically ineffective to transmit signals to the remote point during accelerations.

5. In apparatus of the type defined in claim 4 wherein said last defined means comprises a two-position switch connected in the output circuits of said electrical devices for connecting the output of the device operated by said mass to the remote point and for disconnecting the output of said other device from the remote point during accelerations.

6. In apparatus of the type described, a mass movable in two directions in response to accelerations acting thereon, a pair of electrical devices adapted for connection in a circuit and each having a part angularly displaceable from a null position for developing signals, means for displacing said parts in response to movement of said mass so that one of said parts responds to movement of said mass in one direction and the other part responds to movement of said mass in the opposite direction, and means for connecting in the circuit the device whose part has the larger angular displacement and for disconnecting from the circuit the device whose part has the smaller angular displacement.

7. In apparatus of the type described, an undamped mass responsive to accelerations and freely movable, a signal generating device having a part movable by said mass in one direction, yielding means urging said part in the opposite direction to a predetermined position, and damping means for retarding movement of said part only in said opposite direction toward said predetermined position.

8. Apparatus of the type described comprising a mass free to move in opposite directions in response to positive and negative accelerations, a signal generating device having a part movable in one direction by movement of said mass in one direction, a second signal generating device having a part movable in one direction by movement of said mass in the opposite direction, said parts providing signals corresponding to movements of said mass and moving independently of said mass in the opposite directions, yielding means urging said parts in the opposite directions to predetermined positions, and damping means for retarding movement of said parts toward said predetermined position.

9. Apparatus of the type described comprising a mass free to move in opposite directions in response to positive and negative accelerations, a signal generating device having a part movable in one direction by movement of said mass in one direction, a second signal generating device having a part movable in one direction by movement of said mass in the opposite direction, said parts providing signals corresponding to the movement of said mass and moving independently of said mass in the opposite directions, yielding means urging said parts in the opposite directions to predetermined positions, damping means for retarding movement of said parts toward said predetermined position, and means for adjusting said damping means to vary the rate of retardation exerted thereby.

10. In apparatus of the type described, a mass movable in two directions in response to accelerations, a pair of electrical devices adapted for connection in a circuit and each having a part angularly displaceable from null for developing signals, means for displacing said parts in response to movement of said mass, said means including a lever connected to each part and displaceable therewith, a switch for selectively connecting one of said devices in the circuit when the mass moves in one direction and for connecting the other device in the circuit when the mass moves in the other direction, and a link interconnecting said levers and operable upon movement thereof for actuating said switch.

11. Apparatus of the type described comprising a mass movable in two directions in response to accelerations, a signal generator operable from null to a signal developing condition in response to movement of said mass in one direction, a second signal generator operable from null to a signal developing condition in response to movement of said mass in the other direction, said signal generators being independent of movement of said mass in the opposite directions, means for returning said signal generators from a signal developing condition to null, and means for damping the return of said signal generators to null without affecting operation of said signal generators by said mass.

12. Apparatus of the type described comprising a mass movable in two directions in response to accelerations, a signal generator operable from null to a signal developing condition in response to movement of said mass in one direction, a second signal generator operable from null to a signal developing condition in response to movement of said mass in the other direction, said signal generators being independent of movement of said mass in the opposite directions, controlled means adapted for operation by one of said signal generators in one direction and by the other signal generator in the opposite direction, means for returning said signal generators from a signal developing condition to null, and means for damping the return of said signal generators to null independently of said mass.

13. Apparatus of the type described comprising a mass movable in two directions in response to accelerations, a signal generator operable from null to a signal developing condition in response to movement of said mass in one direction, a second signal generator operable from null to a signal developing condition in response to movement of said mass in the other direction, said signal generators being independent of movement of said mass in the opposite directions and adapted for connection in a circuit, controlled means adapted for connection in the circuit for receiving the signals of said generators, switching means operable by said mass for connecting in the circuit one of said signal generators when the mass is moved in one direction and connecting the other generator when the mass is moved in the other direction, means for returning said signal generators from a signal developing condition to null, and means for damping the return of said signal generators to null independently of said mass.

References Cited in the file of this patent

UNITED STATES PATENTS

| | | |
|---|---|---|
| 2,266,449 | Ullrich et al. | Dec. 16, 1941 |
| 2,371,626 | Kecskemeti | Mar. 20, 1945 |
| 2,394,974 | Bevins | Feb. 19, 1946 |
| 2,396,617 | Steinen | Mar. 12, 1946 |
| 2,440,605 | Hathaway | Apr. 27, 1948 |
| 2,520,944 | Lynn et al. | Sept. 5, 1950 |
| 2,529,619 | Maney | Nov. 14, 1950 |
| 2,552,722 | King | May 15, 1951 |
| 2,613,071 | Hansel | Oct. 7, 1952 |